March 29, 1966 W. H. JOHNSTON 3,243,736

SHIELDED TUNING FORK

Filed May 4, 1964

INVENTOR

WILLIAM H. JOHNSTON

BY Hurvitz & Rose

ATTORNEYS

United States Patent Office 3,243,736
Patented Mar. 29, 1966

3,243,736

SHIELDED TUNING FORK

William H. Johnston, Falls Church, Va., assignor to Melpar, Inc., Falls Church, Va., a corporation of Delaware Filed May 4, 1964, Ser. No. 364,661
5 Claims. (Cl. 333—71)

The present invention relates generally to tuning forks and more particularly to a tuning fork adapted particularly for use in filters, which fork includes a magnetic shield for the driven coil and tine and another magnetic shield for the output coil and tine.

Modern tuning forks have been miniaturized extensively so that their drive and output coils, which usually have common axes, are separated by very short distances. Because of this factor, direct extensive transformer coupling exists between the two coils for all frequencies in a very wide bandwidth. Transformer coupling between the input and output windings is sufficiently great to enable frequencies outside the natural fork bandwidth to be passed with the same order of magnitude as frequencies within the fork bandwidth. In consequence, miniature tuning forks have not generally been utilized as electromechanical filters of the band pass type.

In an attempt to overcome the close magnetic coupling between the input and output coils, I experimented with several forms of magnetic shields. The first shield with which I experimented included a magnetic shim inserted between the tuning fork tines, as taught by U.S. Patents 1,743,178 and 3,083,607. Insertion of a single shim between the tuning fork tines resulted in reducing the off resonance energy coupled through the fork by only 2 decibels. This reduction, which amounts to an attenuation of less than one-half, is not sufficient to enable the tuning fork to be utilized as a satisfactory band pass filter.

After discarding the single shim approach, I experimented with a shield surrounding the input coil and tine, as taught by U.S. Patent 1,708,945. With the output coil and tine unshielded, off resonant energy coupled through the fork was reduced appreciably to 10 db relative to the off resonant energy coupled through the coil with no shielding. It was found that for most applications this was not adequate attenuation outside the frequency band of interest.

Because the shim and single shield did not provide adequate off resonant attenuation, I experimented further by placing a first shield about the input coil and tine and a second shield about the output coil and tine. It was found that inclusion of the second shield resulted in a 14 db attenuation of off resonance energy, i.e., approximately a 133% reduction relative to the single shield approach and a 400% reduction relative to the shim. The increased off resonant attenuation attained with two shields substantially confined the entire magnetic field applied to the input coil. Enough stray field apparently leaked through the single shield to couple substantial off resonant energy to the output coil so that appreciable energy was picked up by the output coil. By shielding both coils separately, coupling of off resonant energy to the output coil was reduced to a level satisfactory for operation of the tuning fork as a band pass filter.

A further advantage in the utilization of separate shields for the input and output coils rather than a single shield for the input coil resides in the size compatability of the former with modern, miniature forks. By employing two shields, tuning forks having thin, sheet metal tines separated by approximately 1/4" may be utilized in obtaining the 14 db off resonant energy reduction. The shield segment extending between the tines is of approximately 1/32" thickness, hence cannot possibly interfere with the tine as it oscillates. If a single shield were employed to obtain the same off resonant attenuation obtained by the two shields, the single shield would be so wide that it could contact the moving tines, hence prevent accurate fork operation.

Another advantage associated with the present invention is that magnetic cross coupling between the input and output coils, i.e., energy coupling external to the tines, is reduced to 40 db below signal level at resonance. Magnetic decoupling at resonance is necessary to prevent relative phase displacement of the energy coupled through the filter. Magnetically coupled energy undergoes a phase shift that differs from the phase shift of energy coupled through the filter via the tuning fork tines. The magnetically coupled energy must be removed if the resonant energy deriving from the filter is to be properly related in amplitude with the resonant energy coupled to it. In experimenting, it was found that only the two shield configuration provided sufficient magnetic decoupling at resonance. The shim and single shield structures coupled so much resonant energy between the two coils that an accurate representation of the resonant energy was not derived from the filter.

An additional feature associated with the utilization of separate shields about the coils is that it enables the fork to be adapted for use with higher frequencies than either of the other approaches. This is because tine movement is inversely related to frequency, assuming constant input power. In consequence, low voltages are induced in the output coil when high frequencies are coupled to the fork and magnetically coupled resonant energy can more readily be an appreciable portion of the total resonant energy deriving from the filter. By employing the shielding structure of the present invention, the high frequency, low amplitude resonant voltage induced in the output winding by the tine greatly exceeds the magnetically coupled voltage so that the possibility of resonant signal distortion is almost completely obviated. The shielding techniques of the prior art do not offer sufficient magnetic decoupling to enable the filter to be designed to pass relatively high frequencies.

It is accordingly an object of the present invention to provide a new and improved tuning fork having a shield configuration whereby modern, miniature forks can be adapted for use in filter circuits.

Another object of the present invention is to provide a new and improved tuning fork having sufficient shielding between its input and output windings to enable the fork to be utilized for relatively high frequency filters.

A further object of the invention is to provide a new and improved modern, miniature tuning fork wherein magnetic resonant as well as off resonant energy is effectively decoupled between the fork input and output coils so that off resonant energy is greatly attenuated and the waveform of resonant energy applied to the fork is accurately reproduced at its output.

An additional object of the invention is to provide a modern, miniature tuning fork wherein a first shield surrounds the input coil and its associated time and another shield surrounds the second coil and its associated tine.

The above and still further objects, features and advantages of the present invention will become apparent upon consideration of the following detailed description of one specific embodiment thereof, especially when taken in conjunction with the accompanying drawings, wherein.

Figures 1, 2, 3, 4, 5:
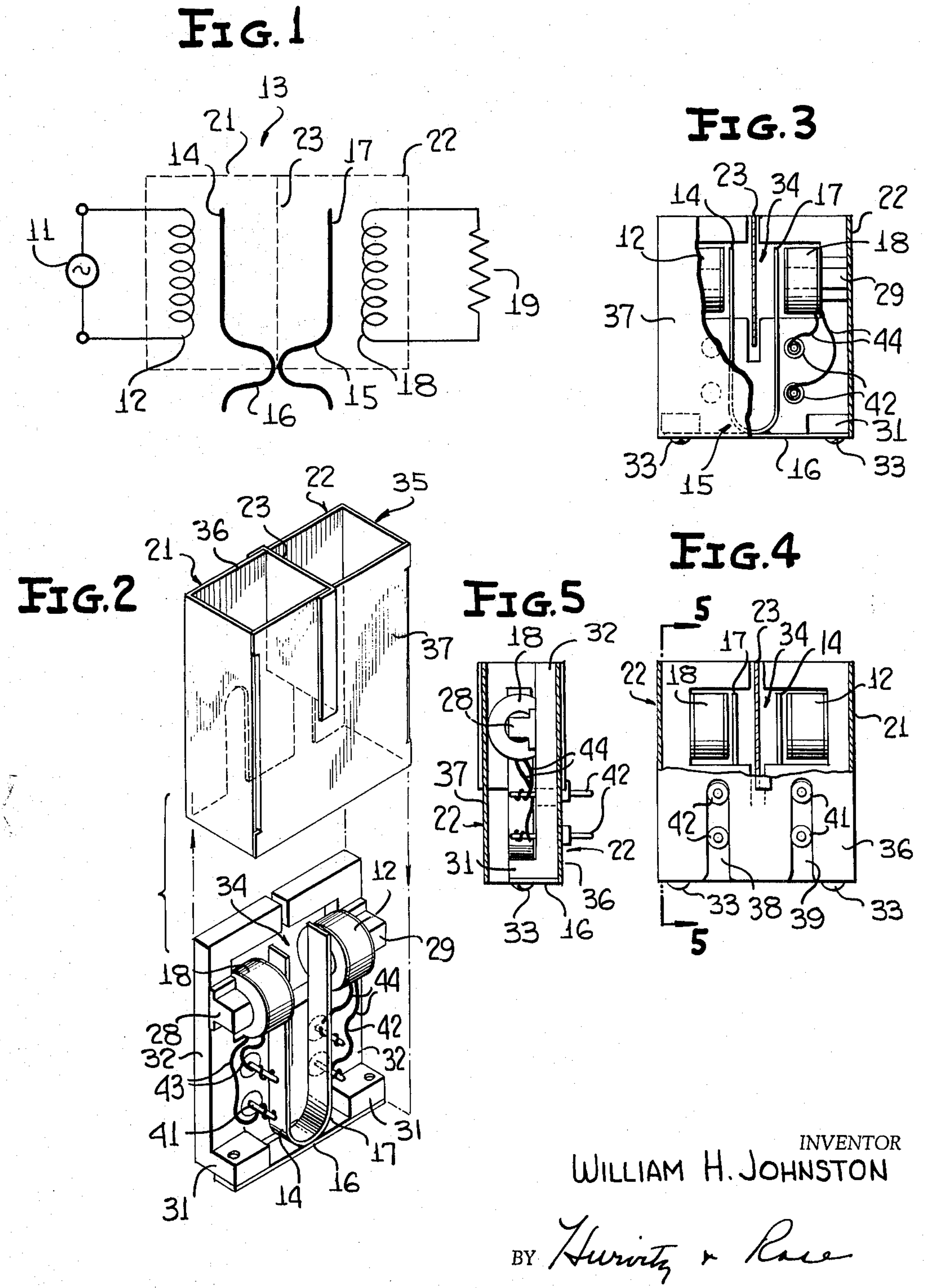
FIGURE 1 is a circuit diagram of a filter employing the tuning fork of the present invention.
FIGURE 2 is an exploded perspective view of a preferred embodiment of the tuning fork of the present invention.
FIGURE 3 is a front view of the tuning fork with the plate of the shield removed.
FIGURE 4 is a back view of the tuning fork when it is completely assembled.
FIGURE 5 is a side sectional view of the tuning fork taken, through the lines 5—5 of FIGURE 4.

Reference is now made to FIGURE 1 of the drawings wherein A.C. signal source 11 is coupled to input coil 12 of tuning fork filter 13. Magnetically coupled with input coil 12 is tine 14 of tuning fork 15, mounted on base 16. Output tine 17 of fork 15 is magnetically coupled to output winding 18 that drives load 19, which in an exemplary case is shown as a resistor. Substantially surrounding coil 12 and tine 14 is a first magnetic shield 21, while a second shield 22 surrounds tine 17 and coil 18; the two shields having as a common wall, plate 23. Shields 21 and 22 are arranged so that magnetic coupling between coils 12 and 18 is virtually eliminated.

In operation, filter 13 serves as a very precise, high Q filter for passing a vary narrow band of frequencies between source 11 and load 19. The magnetic field deriving from coil 12 is substantially confined to the volume surrounded by shield 21. While there is some magnetic leakage around shield 21, it generally leaks through its top and bottom, not through wall 23. The magnetic leakage from shield 21 is not coupled to coil 18 because of the additional shielding effects of shield 22. Hence, there is virtually no transformer action between coils 12 and 18, despite their close proximity. Because coils 12 and 18 are completely decoupled, no off resonant energy is fed through filter 13 to load 19. In addition, there is virtually no magnetic coupling at resonance so the resonant voltage induced in winding 18 is an accurate replica of the resonant energy driving tine 14. No. resonant magnetic coupling occurs because only a single path for the resonant energy exists through the fork tines and virtually no magnetic coupling exists between coils 12 and 14 to cause resonant energy of differing phases to be induced in winding 18.

Reference is now made to FIGURES 2–5 of the drawings wherein a preferred embodiment of the tuning fork of the present invention is illustrated. Sheet metal fork 14, preferably made from NI SPAN C, is mounted on strip 16 that is secured to feet 31 on metal, non-magnetic block 32 by screws 33. Block 32 includes a substantially rectangular cut out area 34 in which cylindrical coils 12 and 18 are positioned. Coils 12 and 18, which have common longitudinal axes are located at either end of cut out 34. The longitudinal axes of coils 12 and 18 are coincident with the axes of permanent magnets 28 and 29, mounted on block 32 at either end of cut out 34. Coils 12 and 18 have their adjacent faces separated by approximately 0.4 inch and their remote faces separated by approximately 0.9 inch so that there is substantial magnetic coupling between them if shields 21 and 22 are not employed.

The shield structure comprises a sheet of highly permeable metal, preferably Mu Metal, that is folded into a right parallelepiped 35 having open vertical ends so that it can slide over block 32. The interior dimensions of shield body 35, approximately 1⅜″ in height, 1¼″ in length, and ½″ in width, are slightly less than the total dimensions of block 32 and strip 16 so that the shield is maintained in fixed position relative to the block only by frictional forces after it is slid over the block.

Center strip 23, about 1/32″ in thickness, extends approximately 13/16″ along the 1⅜″ length of the shield body. Strip 23, secured at either of its ends to the opposed faces 36 and 37 of shield body 35, extends between vertical slots 38 and 39 on body 35 when the shield encompasses block 32.

Coils 12 and 18 are connected to terminal pairs 41 and 42, by leads 43 and 44, respectively. To enable the shield body 35, to encompass the rear of block 32, from which leads 43 and 44, connected to terminal pairs 41 and 42, emanate, vertically extending slots 38 and 39 are provided. Thereby, energy from source 11 excites tine 14 via leads 43 and terminal pair 41; the voltage induced in winding 18 by tine 17 is coupled to load 19 by way of leads 44 as well as terminal set 42.

In operation, there is a very strong magnetic field produced along the longitudinal axis of coil 12 in response to the signal from source 11. The field deriving from coil 12 in the plane parallel to the longitudinal axes of tines 14 and 17 is relatively small so that the lack of shielding at the top or bottom of shield body 35 is not detrimental. Also, the shielding effects of partition 23 are augmented by the effects of tines 14 and 17 so that magnetic coupling along the line directly between the coils 12 and 18 is effectively minimized. However, there is substantial flux leakage between coils 12 and 18 about the path that extends from the left side of coil 12 to the right side of coil 18. Any stray field leaking from the left side of body 35 is intercepted by the side walls of the shield and has virtually no effect on coil 18. Hence, by incorporating the dual shield of the present invention stray fields are virtually eliminated and the improved performance described supra is attained.

While I have described and illustrated one specific embodiment of my invention, it will be clear that variations of the details of construction which are specifically illustrated and described may be resorted to without departing from the true spirit and scope of the invention as defined in the appended claims.

I claim:

1. A tuning fork assembly particularly adapted for use in filters comprising a tuning fork having first and second tines, a first electro-magnetic coil for energizing said first tine, a second electro-magnetic coil coupled to said second tine, means for electromagnetically decoupling said first coil and tine from said second coil and tine, said last named means including a first electromagnetic shield of highly permeable metal substantially surrounding said first coil and tine and a second electromagnetic shield of highly permeable metal substantially surrounding said second coil and tine.

2. The fork assembly of claim 1 further including a rectangular block, means for maintaining said fork on said block; and wherein said first and second electromagnetic shields comprise a parallelepiped of highly permeable material frictionally mounted on said block, said parallelepiped having an open end parallel to the axes of said coils and having a center partition of highly permeable material interposed between said tines.

3. The assembly of claim 1 wherein both of said shields have a common wall separating said tines.

4. A tuning fork resonator comprising a tuning fork including a pair of spaced parallel tines vibrationally coupled via a base portion, an electromagnetic driver coil adjacent the free end of one of said tines, an electromagnetic pickup coil adjacent the free end of the other of said tines, said coils having a substantially common axis perpendicular to the longitudinal axis of symmetry of said tuning fork, a first electromagnetic shield longitudinally enclosing said driver coil and a substantial portion of the length of the tine adjacent said driver coil, a second electromagnetic shield longitudinally enclosing said pickup coil and a substantial portion of the length of the tine adjacent said pickup coil, said first and second electromagnetic shields being composed of high permeability magnetic material, whereby intercoupling of magnetic field between said coils at frequencies outside the resonant frequency bandwidth of said tuning fo:k is substantially eliminated.

5. The resonator according to claim 4 wherein said first and second electromagnetic shields have a common wall between said tines.

References Cited by the Examiner

UNITED STATES PATENTS

| | | | |
|---|---|---|---|
| 1,743,178 | 1/1930 | Wolf | 84—409 |
| 3,083,607 | 4/1963 | Reifel | 331—156 |

HERMAN KARL SAALBACH, *Primary Examiner.*

L. ALLAHUT, *Assistant Examiner.*